June 18, 1946.    W. R. HOLT    2,402,162
EDUCATIONAL DEVICE
Filed June 29, 1944
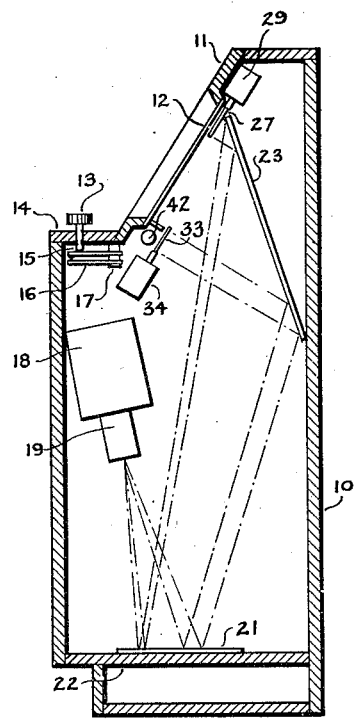
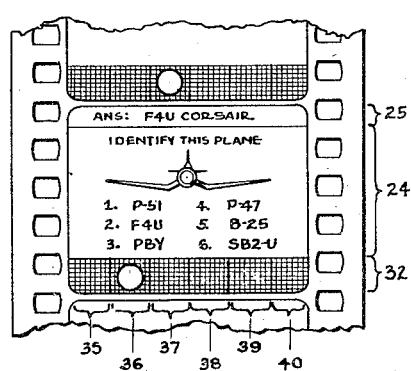
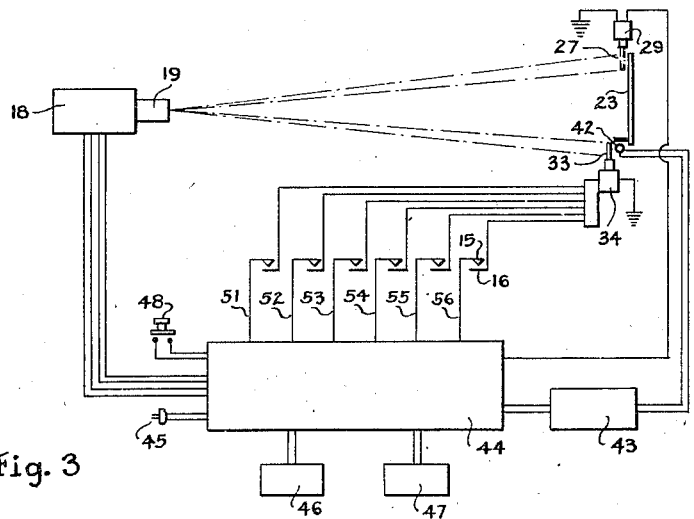
INVENTOR
Wendell R. Holt
BY
ATTORNEY Patented June 18, 1946

2,402,162

UNITED STATES PATENT OFFICE 2,402,162

EDUCATIONAL DEVICE

Wendell R. Holt, United States Navy

Application June 29, 1944, Serial No. 542,791

9 Claims. (Cl. 35—1)

(Granted under the act of March 3, 1883, as amended April 30, 1928; 370 O. G. 757)

The present invention relates to educational devices, and more particularly to an automatic, self-operated machine to facilitate self-education and to give an indication of proficiency by self-operated scoring means.

The principal object of the invention resides in the provision of a device for automatically displaying an illustration or visual representation and a plurality of phrases relating to the illustration including correct and incorrect designations pertaining to the illustration or visual representation, together with a multiple choice selecting mechanism and scoring means for automatically indicating whether the correct designation is chosen.

A further object of the invention resides in the provision of a device as described above, together with means for displaying the correct designation associated with each illustration at a time after the multiple-choice designation has been selected by the student, in order that the student will be informed of the correct designation even though he may make an erroneous designation selection.

A further object of the invention resides in the provision of a unique multiple-choice scoring system comprising a scoring area or portion on a transparent film frame for registering a score together with a photo-electric means and shutters to indicate the correct or incorrect choice of multiple-choice designations.

Another object of the invention resides in the provision of a device as described above wherein the pictures displayed are projected onto a back-lighted screen in order to provide an illustration and phrases relating to the illustration sufficiently large to be easily examined and clearly visible to at least several persons simultaneously.

Further objects will be apparent hereinafter.

Before describing the detail of the structure illustrated in the drawing and chosen as best illustrative of the principles of the invention, it is believed pertinent to point out that the inventor recognizes the existence of certain devices arranged to display an illustration together with multiple-choice answers, and to indicate the correct choice of an answer. So far as is known, however, all of such prior devices have been highly objectionable in certain features and it is submitted that the present invention, by overcoming the objections to the prior art structures, makes a substantial and valuable contribution to the art.

In considering the various characteristics of the present disclosure it should be kept in mind that machines of this character may be used in the training of military personnel in technical matters. When so used, it is important to provide as high a degree of amusement and maintain as high a degree of competitive spirit as possible. In this connection, it may be pointed out that in all naval training stations the educational schedule is very intensive, and that self-operated devices having no factor of amusement are of little value. It has been discovered, however, that machines of the character here disclosed provide a sufficient degree of amusement so that even after personnel have spent a full day in formal classroom or field study, they will find sufficient amusement in the operation of the machine to utilize their spare time in recreation rooms and barracks in manipulation of the device and in competitive efforts to obtain a good score.

Further, in a device designed for use in crowded quarters, as, for example, in enlisted men's barracks, it is desirable that the teaching capacity of the device shall not be limited to one person, but shall include several or many. One of the most serious deficiencies of prior devices of this character is that they ordinarily display a relatively small illustration, placed deep below a small window or lens, so that it is difficult to observe and so that it may be seen only by one person at a time. Obviously, such an arrangement does not foster the development of a competitive spirit between members of a group.

In contrast to this, the present device projects a sufficiently large illustration on a screen so that it may be viewed by many persons at any reasonable angle, and within any reasonable distance from the screen; so that as one person operates the mechanism and makes his choice of the designations or phrases in relation to the illustration, others may observe what is being done and observe the correctness or inaccuracy of the designations as they are given. With this arrangement, a greater incentive for competition is presented and, since the phrases pertaining to the illustrations are in sufficiently large print so that they may be easily read, the continued operation of the device is not tiring to the student.

In general, the invention contemplates the provision of an automatic machine having an external screen of relatively large dimensions so positioned that it may be viewed by a number of persons simultaneously. In addition to the screen, the cabinet of the machine will be provided with a plurality of designation selecting buttons and a scoring dial so that as each illustration is presented, the student may make a choice of one of the several possible designations and depress the button corresponding to what he believes is the correct designation. The scoring device will then indicate whether his designation is correct, and, irrespective of whether the correct or incorrect designation is selected, the correct designation will appear on the screen.

The internal mechanism of the device includes an optical projector which acts through a pair of mirrors to throw the image on the screen. The projector is provided with a magazine including a continuous loop of moving picture film in which each frame includes an illustration, a plurality of multiple-choice designations, of which one is correct, and an identified correct designation corresponding to one of the multiple-choice designations. In addition, each frame of the film includes a scoring portion or area which will cause the machine to register the correct or incorrect designation on the scoring mechanism when the selecting key is depressed.

The exact form of the invention illustrated in the drawing attached to and forming a part of the present specification is included by way of illustration rather than limitation, but it describes and illustrates one possible manner in which the principles of the invention may be utilized. However, it is recognized that many minor modifications may be made, and that various departures from the exact structure or wiring system illustrated in the drawing can be indulged in without departing from the inventive spirit.

Referring now more particularly to the drawing:

Figure 1 is a central sectional view through the cabinet of a device illustrative of the principles of the present invention.

Figure 2 is a fragmental detail view of a portion of the continuous strip film utilized in the invention, and Figure 3 is a schematic block diagram of one control circuit whereby the functions of the invention may be accomplished.

The machine comprises, in general, a cabinet 10 in which all of the working parts of the mechanism are enclosed. The forward top portion of the cabinet is provided with an inclined portion 11 in which a translucent screen 12 is mounted. The screen 12 is rectangular in form and extends substantially the full width between the side walls of the cabinet. The height of the screen approximates the entire height of the inclined portion 11 of the cabinet.

The cabinet is also provided with a plurality of multiple-choice designation selecting buttons 13. In the form illustrated, these buttons 13 are arranged in a transverse line across the shelf 14 of the cabinet. Any suitable number of selecting buttons may be used. The number of buttons should, however, correspond to the number of possible designations listed on the illustrations projected on the screen 12. In the device shown, six designation selecting buttons are used and each button is numbered to correspond with the designation list on each illustration. Each of the selecting buttons is arranged to operate a pair of electric contacts 15 and 16 mounted on suitable insulated mounts 17. The buttons are mechanically interlocked to prevent simultaneous closing of more than one pair of contacts. Enlarged pictures are projected on the screen 12 by the projector 18, the lens 19 of which is directed toward a mirror 21 on the sub base 22 of the cabinet. The light projected from the lens 19 is redirected upwardly to the mirror 23 and reflected from the mirror 23 directly onto the screen 12.

Examination of Figure 2 will disclose that, in the exemplary embodiment shown, each frame of the film includes a center portion 24 having an illustration, and phrases relating to the illustration including a question, and a series of six possible designations or answers. This area 24 is positioned in the central portion of the film frame which is projected on the screen 12 at all times. Immediately above this portion 24 of the film is a correct answer designation area or portion 25 which, when projected through the mirrors 21 and 23 will fall on the back surface of an opaque correct answer-concealing shutter 27. The shutter 27 is magnetically operated by the solenoid 29. Thus when the film is projected onto the screen with the shutter 27 in the position illustrated, the upper portion of the screen will be blank, and the picture visible on the screen will include only the illustration, the question, and the multiple-choice designations. The identified correct answer designation will be revealed only after one of the selector buttons 13 have been depressed.

Each frame of the film also includes a scoring portion or area 32 having six separate scoring zones 35 to 40 inclusive, corresponding to the multiple-choice designations or answers and positioned along one edge of the frame, so that when a beam of light is projected through a transparent one of the scoring zones it will be directed through the mirrors 21 and 23, will be blocked by one of the banks of scoring shutters 33, unless the shutter has been lifted by one of the solenoids 34.

The several multiple-choice designations or answers shown on the film illustrated include one correct answer and five incorrect answers. Thus five of the six scoring zones in the designation or answer area 32 will have completely opaque surfaces, and one will have a transparent portion so that a beam of light will be transmitted through the film to the photo-electric cell 42 unless blocked by one of the shutters 33. It is conceivable, of course, that a series of multiple-choice designations or answers may be provided in which more than one designation or answer is correct. For example, if the answers number 1, 2, 4, and 6 were incorrect and the answers 3 and 5 were correct, the scoring zones 35, 36, 38, and 40 would be entirely opaque and the zones 37 and 39 would include a transparent portion. Also, it is contemplated that one or more photo-cells 42 may be employed.

When the frame of film is projected from the lens 19 of the projector 18, light emitted from a transparent portion in any of the scoring zones will be reflected through the mirrors 21 and 23 onto one of the shutters 33. As long as the shutters 33 are in the position illustrated in Figure 1, the light from the projector will have no effect on the photo-electric cells 42 behind the shutters. However, if a button 13 corresponding to a correct designation or answer has been depressed, the shutter 33 operated by that button, and corresponding to the correct designation scoring zone having a transparent portion, will be moved out of the path of the ray of light and the light will fall on the photo-electric means 42. This will operate through the amplifier 43 and timer 44, to cause the device to indicate a correct score on the scoring device 47.

The operation of the device is as follows: The student desiring to use the machine will depress the start button 48. This starts the timing and sequence unit 44, which then controls the entire operation of the machine, and automatically displays a series of illustrations as, for example, a series of ten separate frames of the film shown in Figure 2. The first function of the timer 44 will be to close the power circuits which extend from the plug 45 to the projector 18, the photoelectric cell, amplifier 43, counter 47, question or frame number indicator 46, and to each of the several designation or answer selector circuits 51 to 56 inclusive. The projector lamp will be energized and will project on the screen the central area 24 of a given frame of the film. This will display the illustration, the question, and the series of multiple-choice answers or designations, but the identified correct answer or designation portion of the film 25 will be concealed by the shutter 27. Also a light beam will be projected through the transparent correct designation or answer scoring zone, but is stopped by one of the shutters 33. The student will observe the illustration, choose what he believes to be the correct answer from the multiple-choice answers, and depress the selector button 13 numbered to correspond with the answer or designation he has selected on the illustration.

If a correct designation or answer is chosen, and the contacts 15 and 16 are closed, and the winding of the solenoid 34 is energized and the corresponding shutter 33 moved out of position, the beam of light projected through the corresponding correct designation scoring zone will reach the photocell 42. The photocell is connected to the circuit of the counter through the amplifier 43 and the timing unit 44 so that when the photo-electric cell is energized the scoring unit 47 will register a correct score.

When an incorrect designation or answer selector button 13 is depressed, the circuit through the solenoid winding 34 associated with that particular button and with the particular incorrect designation scoring zone on the film will be energized and its shutter will be moved out of the path of travel of the light channel. However, since the designation or answer is incorrect, no light will be transmitted through the opaque film zone, and light transmitted through the correct channel will be blocked by one of the other shutters. Thus no light will reach one of the photoelectric cells 42, and no score will be registered thereby.

When the allotted time for actuating the correct designation or answer button 13 has expired, the timer 44 will automatically register an incorrect response, energize the question counting unit 46 to indicate that the second question is about to be presented, and will energize the motor of the projector 18 to advance the film to the next frame. It is to be noted, however, that the timing and sequence unit 44 includes means to energize the solenoid coil 29, open the correct designation or answer concealing shutter 27 and display the correct designation or answer on the screen after a choice has been made by operation of one of the selector buttons 13.

When the entire series of 10 frames of the film has been completed, the timer and sequence unit 44 breaks the circuits to the scoring unit 47, projector 18, amplifier 43, question number indicator 46, and will also break an internal holding circuit across the pushbutton 48 so that further operation of machine can be accomplished only by beginning a new cycle. This is done by depressing the starting button. The completion of the cycle will leave the final total score registered on the counting mechanism so that it may be observed after the cycle has ended.

When the timing or starting button 48 is again depressed to start a new cycle, the timer will momentarily energize the counter to reset it to zero simultaneously with the projection of the first picture on the screen.

Since it has heretofore been pointed out that the particular structure and arrangement of parts illustrated in connection with this invention are intended for purposes of illustration and are subject to many modifications and variations, the scope of the inventive thought should be considered as limited only by the prior art and the terms of the appended claims.

The invention described herein may be manufactured and used by or for the government of the United States of America for governmental purposes without the payment of any royalties thereon or therefor.

I claim:

1. In apparatus including a closed cabinet and a translucent screen comprising a portion of said cabinet with an optical projector within the said cabinet to project light through a film to project the film image on to the inner surface of said screen, a film comprising a multiplicity of individual frames inter-connected to form a continuous endless loop, each of said frames bearing a visual representation, a plurality of designations including correct and incorrect designations relating to said visual representation, and a scoring portion having scoring zones thereon corresponding to the aforementioned designations, the correct and incorrect scoring zones being of unlike light transparency, and scoring means including means actuated by light transmitted through a correct designation scoring zone for registering a score.

2. In apparatus including a closed cabinet and a translucent screen comprising a portion of said cabinet and an optical projector within said cabinet to project light through a film to project the film image on to the inner surface of said screen, a film bearing a visual representation, a plurality of designations including correct and incorrect designations and an identified correct designation relating to said visual representation, and a scoring portion having scoring zones corresponding to said correct and incorrect designations, and scoring means including a plurality of separate individually operable shutters and manually operable controls corresponding to and adapted to actuate said shutters to permit the passage of any light passing through the scoring portion of the film to register a score, a designation concealing shutter to conceal the identified correct designation projected from the film and means responsive to the operation of any one of the aforementioned manually operable controls to open the designation concealing shutter.

3. In apparatus including an optical projector and screen, a film bearing an illustration, a plurality of designations and an identified correct designation relating to said illustration, and a scoring portion, scoring means including a plurality of separate individually operable shutters and manually operable controls corresponding to and adapted to actuate said shutters to permit the passage of any light passing through the scoring portion of the film to register a score, a designation concealing shutter to conceal the identified correct designation projected from the film, and means responsive to the operation of any one of the aforementioned manually operable controls to open the designation concealing shutter.

4. In apparatus including an optical projector and screen, a film comprising a continuous endless strip made up of a multiplicity of individual frames, each frame of which bears an illustration, a plurality of designations and an identified correct designation relating to said illustration, and a scoring portion including at least one transparent zone and at least one opaque zone, and scoring means including means actuated by light transmitted through a transparent zone for registering a score.

5. In apparatus including an optical projector and screen, a film including an illustration, a plurality of designations including a correct designation relating to said illustration, and a scoring portion including at least one transparent zone and at least one opaque zone, separate individually operable shutters corresponding to each of said zones including a shutter controlling the light projected through the transparent zone, and separate manually operable controls corresponding to and adapted to actuate each of said shutters, at least one photo-electric cell to receive a ray of light projected through the transparent zone of the scoring portion, and means responsive to the action of the photo-electric cell to indicate that the manual control corresponding to the correct designation has been actuated, by registering a correct score.

6. In apparatus including an optical projector and screen, a film comprising a continuous endless strip made up of a multiplicity of individual frames, each frame of which bears a visual representation, a plurality of designations and an identified correct designation relating to said visual representation, and a scoring portion including at least one transparent zone and at least one opaque zone, separate individually operable shutters one for each of said zones in the scoring portion, at least one of said shutters normally lying in the path of a ray of light projected through a transparent zone, and manually operable controls corresponding to and adapted to actuate each of said shutters to move them out of the path of any light passing through the corresponding zone, a designation concealing shutter to conceal the identified correct designation projected from the film, means responsive to the operation of any one of the aforementioned manually operable controls to open the correct designation concealing shutter, at least one photo-electric cell in the path of light projected from a transparent zone of said scoring portion, and scoring means responsive to the action of the photo-electric cell to indicate that the manual control corresponding to the correct designation has been actuated, by registering a score.

7. Educational apparatus comprising an optical projector adapted for cooperation with an element bearing an image including a score determining portion, a screen arranged to receive a projected image from said element and projector, scoring means responsive to the effect of said scoring portion upon light from said projector and manual selection means for actuating said scoring means.

8. Educational apparatus comprising an optical projector adapted for cooperation with a combined subject, answer and scoring image bearing element, a screen arranged to receive a projected image from said element and projector, scoring means responsive to the effect of said scoring image upon light from said projector, a plurality of manual selection means for presenting said answer image on said screen, and certain of said selection means also actuating said scoring means for a particular scoring image.

9. Educational apparatus comprising an optical projector adapted for cooperation with a combined subject and scoring image bearing element, a screen arranged to receive a projected image from said element and projector, manual selection means for actuating said element, and photoelectric means actuated by certain of said selection means in response to the properties of said scoring image for transmitting light from said projector.

WENDELL R. HOLT.